United States Patent
Zhu

(10) Patent No.: US 12,402,058 B2
(45) Date of Patent: Aug. 26, 2025

(54) DATA TRANSMISSION METHOD AND ELECTRONIC DEVICE

(71) Applicant: VIVO MOBILE COMMUNICATION CO., LTD., Dongguan (CN)

(72) Inventor: Mengqiang Zhu, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 431 days.

(21) Appl. No.: 17/952,302

(22) Filed: Sep. 25, 2022

(65) Prior Publication Data

US 2023/0018089 A1 Jan. 19, 2023

Related U.S. Application Data

(63) Continuation of application No. PCT/CN2021/083047, filed on Mar. 25, 2021.

(30) Foreign Application Priority Data

Mar. 26, 2020 (CN) .......................... 202010224953.1

(51) Int. Cl.
*H04W 40/02* (2009.01)
*H04L 61/4511* (2022.01)
*H04W 40/24* (2009.01)

(52) U.S. Cl.
CPC ......... *H04W 40/02* (2013.01); *H04W 40/246* (2013.01); *H04L 61/4511* (2022.05)

(58) Field of Classification Search
CPC .. H04W 40/02; H04W 40/246; H04L 61/4511
See application file for complete search history.

(56) References Cited

U.S. PATENT DOCUMENTS

| 2008/0058031 | A1 | 3/2008 | Deprun |
| 2014/0321265 | A1 | 10/2014 | Pitchai et al. |
| 2015/0382264 | A1* | 12/2015 | Cho ...................... H04W 76/10 370/338 |

FOREIGN PATENT DOCUMENTS

| CN | 104144231 A | 11/2014 |
| CN | 104285476 A | 1/2015 |

(Continued)

OTHER PUBLICATIONS

International Search Report issued in corresponding International Application No. PCT/CN2021/083047, mailed Jun. 23, 2021, 4 pages.

(Continued)

*Primary Examiner* — Natasha W Cosme
(74) *Attorney, Agent, or Firm* — IPX PLLC

(57) ABSTRACT

A data transmission method and a first electronic device are provided. The data transmission method includes: sending a first request to a second electronic device in a case that a first electronic device accesses a network hotspot of the second electronic device; receiving a first response of the network hotspot that is fed back by the second electronic device in response to the first request. The first response includes the hotspot information. The data transmission method further includes when the hotspot information does not include a Domain Name Service (DNS) parameter of the network hotspot, configuring a data network route to transmit first data, and configuring a target policy route to transmit second data. The second data is data transmitted between the first electronic device and the network hotspot.

15 Claims, 4 Drawing Sheets

(56) References Cited

FOREIGN PATENT DOCUMENTS

| | | |
|---|---|---|
| CN | 105376835 A | 3/2016 |
| CN | 106953752 A | 7/2017 |
| CN | 107071867 A | 8/2017 |
| CN | 108924274 A | 11/2018 |
| CN | 109151863 A | 1/2019 |
| CN | 109526020 A | 3/2019 |
| CN | 109661016 A | 4/2019 |
| CN | 109889499 A | 6/2019 |
| CN | 111556552 A | 8/2020 |
| WO | 2011116726 A2 | 9/2011 |
| WO | 2013166196 A1 | 11/2013 |
| WO | 2016101482 A1 | 6/2016 |

OTHER PUBLICATIONS

First Office Action issued in related Chinese Application No. 202010224953.1, mailed Oct. 28, 2021, 9 pages.
Second Office Action issued in related Chinese Application No. 202010224953.1, mailed May 20, 2022, 5 pages.
Extended European Search Report issued in related European Application No. 21774891.2, mailed Jul. 28, 2023, 9 pages.

* cited by examiner

DATA TRANSMISSION METHOD AND ELECTRONIC DEVICE

CROSS-REFERENCE TO RELATED APPLICATIONS

This application is a continuation of International Application No. PCT/CN2021/083047, filed on Mar. 25, 2021, which claims priority to Chinese Patent Application No. 202010224953.1 filed on Mar. 26, 2020. The entire contents of each of the above-referenced applications are expressly incorporated herein by reference.

TECHNICAL FIELD

Embodiments of the present disclosure relate to the field of communications technologies, and in particular, to a data transmission method and an electronic device.

BACKGROUND

With continuous development of electronic device technologies, increasingly more application functions are integrated into an electronic device. Currently, most electronic devices have a Wireless Fidelity (WiFi) hotspot function, so that another electronic device can access a wireless network by accessing a portable hotspot of the electronic device.

However, portable WiFi hotspots of some electronic devices can only implement data transmission between electronic devices, and have no network access capability. Therefore, after another electronic device accesses the portable Wi-Fi hotspots of these electronic devices, the electronic devices cannot maintain normal network access.

For example, as an electronic device of an automobile component type that ensures driving safety of a driver, an automobile data recorder becomes a necessary electronic device of a person having a vehicle. In a driving process, a user's mobile phone may receive, by accessing a hotspot of the automobile data recorder, a real-time picture photographed by the automobile data recorder. Then, after the mobile phone accesses a hotspot of the automobile data recorder, normal use of the automobile data recorder is ensured, but a mobile phone system cannot maintain normal network access with another application.

SUMMARY

Embodiments of the present disclosure provide a data transmission method and an electronic device.

This application is implemented as follows:

According to a first aspect, an embodiment of the present disclosure provides a data transmission method, where the method is performed by a first electronic device, and the method includes:

sending a first request to a second electronic device in a case that the first electronic device accesses a network hotspot of the second electronic device, where the first request is used to request hotspot information of the network hotspot; receiving hotspot information of the network hotspot that is fed back by the second electronic device in response to the first request; and if the hotspot information does not include a DNS parameter of the network hotspot, configuring a data network route to transmit first data, and configuring a target policy route to transmit second data; where the second data is data transmitted between the first electronic device and the network hotspot.

According to a second aspect, an embodiment of the present disclosure further provides an electronic device, where the electronic device is a first electronic device, and the first electronic device includes:

a sending module, configured to send a first request to a second electronic device in a case that the first electronic device accesses a network hotspot of the second electronic device, where the first request is used to request hotspot information of the network hotspot; a receiving module, configured to receive hotspot information of the network hotspot that is fed back by the second electronic device in response to the first request; and a configuration module, configured to: if the hotspot information does not include a DNS parameter of the network hotspot, configure a data network route to transmit first data, and configure a target policy route to transmit second data; where the second data is data transmitted between the first electronic device and the network hotspot.

According to a third aspect, an embodiment of the present disclosure provides a terminal device, including a memory, a processor, and a computer program that is stored in the memory and that can run on the processor, where when the computer program is executed by the processor, steps in the data transmission method provided in the first aspect are implemented.

According to a fourth aspect, an embodiment of the present disclosure provides a computer-readable storage medium, where the computer-readable storage medium stores a computer program, and when the computer program is executed by a processor, steps of the data transmission method provided in the first aspect are implemented.

DETAILED DESCRIPTION

Figure 1:
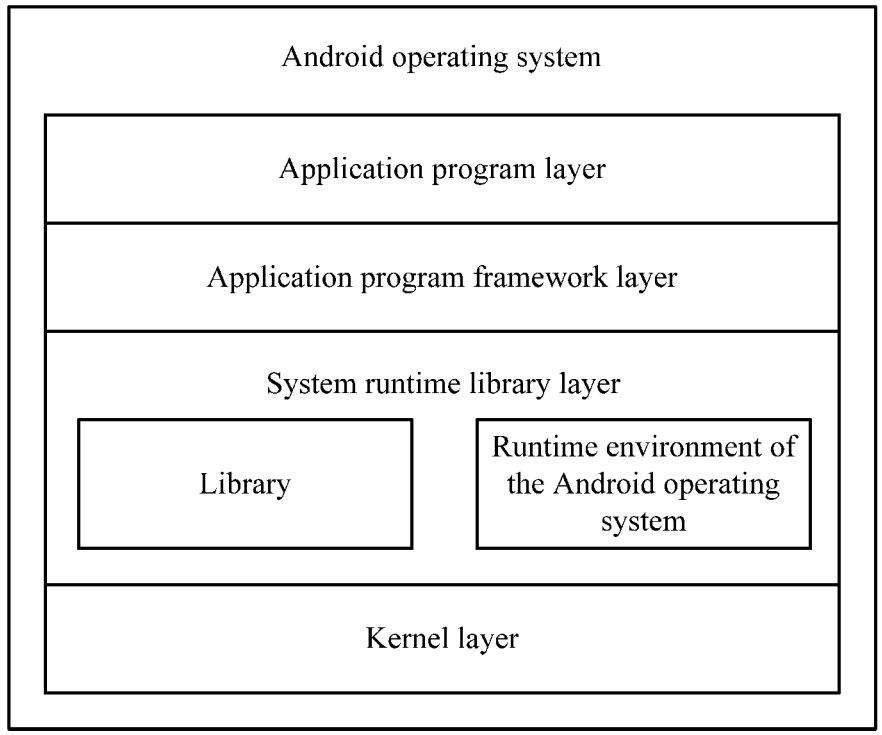
FIG. 1 is a possible schematic architectural diagram of an Android operating system according to an embodiment of this application.

The following describes the technical solutions in the embodiments of the present disclosure with reference to the accompanying drawings in the embodiments of the present disclosure. Apparently, the described embodiments are some rather than all of the embodiments of the present disclosure. Based on the embodiments of the present disclosure, all other embodiments obtained by a person of ordinary skill in the art without creative efforts fall within the protection scope of the present disclosure.

It should be noted that "I" in this specification represents or. For example, A/B may represent A or B; "and/or" in this specification merely describes an association relationship of associated objects, and indicates that there may be three relationships. For example, A and/or B may represent that there are three cases: There is only A, there are both A and B, and there is only B.

It should be noted that "multiple" in this specification means two or more.

It should be noted that, in the embodiments of the present disclosure, words such as "exemplary" or "for example" are used to indicate an example, an instance, or descriptions. Any embodiment or design scheme described as "exemplary" or "an example" in the embodiments of the present disclosure should not be construed as being preferable or advantageous than other embodiments or design schemes. The words such as "exemplary" or "for example" are used to present related concepts in a specific manner.

It should be noted that, for ease of clearly describing the technical solutions in the embodiments of the present disclosure, in the embodiments of the present disclosure, the words "first", "second", and the like are used to distinguish between same or similar items with basically the same functions. A person skilled in the art may understand that the words "first", "second", and the like do not limit a quantity and an execution sequence. For example, first data and second data are used to distinguish between different data, and are not used to describe a specific sequence of data.

The electronic device in the embodiments of the present disclosure may be a terminal device. For example, the terminal device may be a mobile terminal device, or may be a non-mobile terminal device. The mobile terminal device may be a mobile phone, a tablet computer, a notebook computer, a palmtop computer, an in-vehicle terminal device, a wearable device, an Ultra-Mobile Personal Computer (UMPC), a netbook, or a Personal Digital Assistant (PDA), and the non-mobile terminal device may be a Personal Computer (PC), a Television (TV), a counter, or a self-service computer. This is not limited in the embodiments of the present disclosure.

The data transmission method provided in the embodiments of the present disclosure may be performed by an electronic device or a functional module and/or a functional entity in the electronic device that can implement the data transmission method. In some embodiments, this may be determined according to an actual use requirement, and is not limited in the embodiments of the present disclosure.

The electronic device in the embodiments of the present disclosure may be an electronic device with an operating system. The operating system may be an Android operating system, may be an iOS operating system, or may be another possible operating system. This is not limited in the embodiments of the present disclosure.

The Android operating system is used as an example below to describe a software environment to which a data transmission method provided in an embodiment of the present disclosure is applied.

FIG. 1 is a schematic architectural diagram of an Android operating system according to an embodiment of the present disclosure. In FIG. 1, an architecture of the Android operating system includes four layers: an application program layer, an application program framework layer, a system runtime library layer, and a kernel layer (which may be a Linux kernel layer).

The application program layer includes various application programs in the Android operating system (including a system application program and a third-party application program).

The application program framework layer is a framework of an application program. A developer can develop some application programs based on the application program framework layer while complying with a development principle of the framework of the application program.

The system runtime library layer includes a library (also referred to as a system library) and an Android operating system operating environment. The library mainly provides the Android operating system with various required resources. The Android operating system miming environment is used to provide a software environment for the Android operating system.

The kernel layer is an operating system layer of the Android operating system, and is a bottom layer in Android operating system software layers. The kernel layer provides a core system service and a hardware-related driver for the Android operating system based on a Linux kernel.

The Android operating system is used as an example. In the embodiments of the present disclosure, the developer may develop, based on the foregoing system architecture of the Android operating system shown in FIG. 1, a software program for implementing the data transmission method provided in the embodiments of the present disclosure, so that the data transmission method may run based on the Android operating system shown in FIG. 1. In other words, a processor or a terminal device may run the software program in the Android operating system to implement the data transmission method provided in the embodiments of the present disclosure.

The data transmission method provided in the embodiments of the present disclosure may be applied to a multi-link transmission scenario.

A technical method provided in the embodiments of the present disclosure is as follows: in a case that a first electronic device accesses a network hotspot of a second electronic device, the first electronic device may send a first request to the second electronic device to request hotspot information of the network hotspot; and when hotspot information received by the first electronic device does not include a domain name system (service) protocol (Domain Name System (DNS)) parameter of the network hotspot, it indicates that the network hotspot does not have a function of delivering a DNS, that is, the network hotspot cannot ensure that an accessed electronic device can perform normal network access. In this case, the first electronic device may configure a data network route to transmit first data, and configure a target policy route to transmit second data, to ensure that the first electronic device performs normal network access, and to further ensure that the first electronic device can maintain data transmission with the second electronic device through the network hotspot.

The data transmission method provided in the embodiments of the present disclosure is described below with reference to the accompanying drawings.

Figure 2:
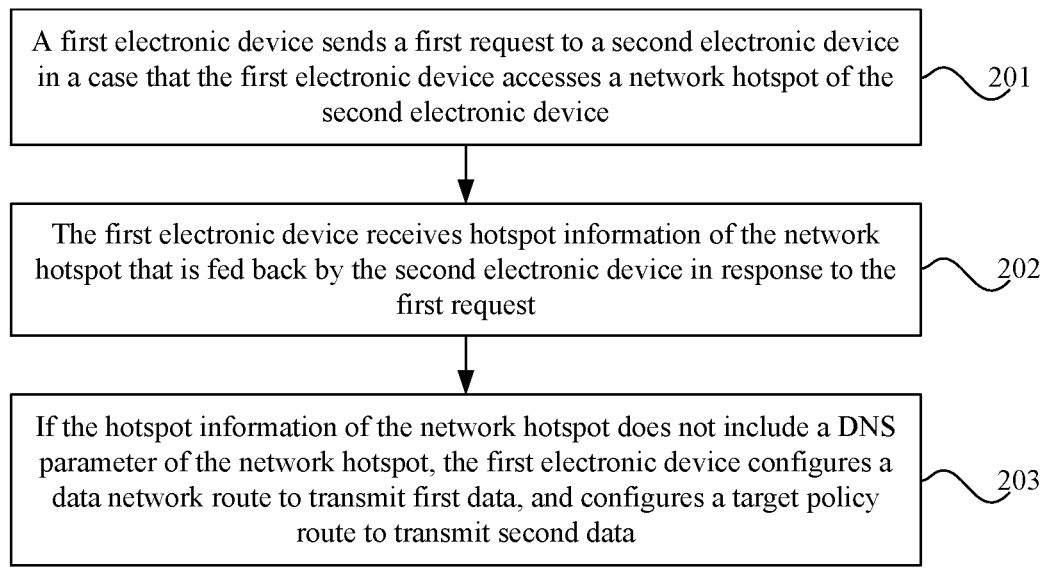
FIG. 2 is a first schematic flowchart of a data transmission method according to an embodiment of the present disclosure.

As shown in FIG. 2, an embodiment of the present disclosure provides a data transmission method. The method includes step 201 to step 203.

Step 201: A first electronic device sends a first request to a second electronic device in a case that the first electronic device accesses a network hotspot of the second electronic device.

The first request is used to request hotspot information of the network hotspot.

For example, the hotspot information of the network hotspot includes at least one of the following information: a domain name system (service) protocol (DNS) parameter, a WiFi hotspot name, a MAC address, or the like.

In this embodiment of the present disclosure, when the network hotspot of the second electronic device is in an on state, the network hotspot of the second electronic device is broadcast. Another user within coverage of the network hotspot of the second electronic device may receive a hotspot name of the network hotspot of the second electronic device. When the another electronic device needs to be connected to the network hotspot of the second electronic device, after determining a name of the network hotspot to be connected, the another electronic device may be connected to a hotspot network corresponding to the name of the network hotspot through password authentication. After the connection succeeds, another electronic device connected to the second electronic device may use data traffic of the second electronic device to implement network sharing.

It may be understood that after the first electronic device accesses the network hotspot of the second electronic device, the first electronic device may perform network access by using the data traffic of the second electronic device.

Step 202: The first electronic device receives hotspot information of the network hotspot that is fed back by the second electronic device in response to the first request.

For example, after receiving the first request sent by the first electronic device, the second electronic device responds to the first request, to feed back a first response to the first electronic device, where the first response includes the hotspot information of the network hotspot of the second electronic device.

Step 203: If the hotspot information of the network hotspot does not include a DNS parameter of the network hotspot, the first electronic device configures a data network route to transmit first data, and configures a target policy route to transmit second data.

The second data is data transmitted between the first electronic device and the network hotspot of the second electronic device (for example, data sent through the network hotspot of the second electronic device to the first electronic device or data sent by the first electronic device to the network hotspot of the second electronic device), and the first data is other data of the first electronic device except the second data (for example, data sent by another network device and received by the first electronic device other than the data sent through the network hotspot of the second electronic device, or data sent by the first electronic device to another network device except the network hotspot of the second electronic device).

In this embodiment of the present disclosure, whether a hotspot delivers a DNS parameter can represent whether the hotspot has a network access capability. Therefore, the first electronic device may determine, by using whether a hotspot end delivers DNS data, whether the network hotspot of the second electronic device has a network access function. In other words, when the first response fed back by the second electronic device does not include the DNS parameter of the network hotspot, it indicates that the network hotspot does not deliver the DNS data, that is, the network hotspot does not have the network access capability.

For example, the second electronic device is an automobile data recorder. Currently, a hotspot of an automobile data recorder on the market generally does not have a DNS function. Therefore, the first electronic device may determine, by using whether the hotspot end delivers the DNS parameter, whether the hotspot is a hotspot of the automobile data recorder.

In this embodiment of the present disclosure, a network interface in the data network route is a network interface of a data network, and a network interface in the target policy route is a network interface of a hotspot network. Further, a destination address of the target policy route is a device IP of the second electronic device.

In this embodiment of the present disclosure, the first electronic device may ensure that a default network of the first electronic device is a data network, to avoid network switching of the first electronic device, so as to ensure that the first electronic device can maintain data transmission with the second electronic device through the network hotspot while ensuring that the first electronic device performs normal network access, so that a system and an application in the first electronic device can continuously and normally access the network without being interrupted by the foregoing network hotspot.

For example, in this embodiment of the present disclosure, the second electronic device may be an automobile data recorder.

For example, in this embodiment of the present disclosure, a network route table of the first electronic device includes a data network route corresponding to the data network. Further, after determining that the hotspot information of the network hotspot does not include the DNS parameter of the network hotspot, the first electronic device may add the target policy route to the network route table.

For example, the network route table includes a default network route and a data network route. When the default network of the first electronic device is a hotspot network of the network hotspot, the default network route is the target policy route. When the default network of the first electronic device is a mobile network, the default network route is the mobile network route.

For example, after step 203, if a destination IP of data that the first electronic device needs to send is an IP address of the second electronic device, the first electronic device obtains the target policy route from the network route table, and sends the data to the second electronic device based on a network interface (that is, the network interface of the hotspot network) in the target policy route; in other words, the data is the foregoing second data. If a destination network of data that the first electronic device needs to send is a data network, the first electronic device obtains the data network route from the network route table, and sends the data based on a network interface of the data network route (that is, a network interface of the mobile network); in other words, the data is the foregoing first data.

For example, in this embodiment of the present disclosure, the target policy route is a temporary policy route. When the first electronic device is disconnected from the network hotspot, the first electronic device automatically clears the target policy route in the network route table of the first electronic device, to avoid a risk that the first electronic device forgets to clear or fails to clear.

It should be noted that in a process in which the first electronic device is connected to or disconnected from or data interaction needs to be performed with the second electronic device, it can be ensured that a normal network capability of the system of the first electronic device is not affected. In all processes involving data interaction with the second electronic device, a data network of the system of the first electronic device is not affected, and a network access capability of the system of the first electronic device is not affected. In this way, both normal use of the second electronic device and a normal network access capability of the system can be satisfied.

According to the data transmission method provided in this embodiment of the present disclosure, in a case that the first electronic device accesses the network hotspot of the second electronic device, the first electronic device may send the first request to the second electronic device to request the hotspot information of the network hotspot. When the hotspot information received by the first electronic device does not include the DNS parameter of the network hotspot, it indicates that the network hotspot does not have a function of delivering a DNS; in other words, the network hotspot cannot ensure that an accessed electronic device can perform normal network access. In this case, the first electronic device may configure a data network route to transmit first data, and configure a target policy route to transmit second data, to ensure that the first electronic device performs normal network access, and to further ensure that the first electronic device can maintain data transmission with the second electronic device through the network hotspot.

For example, in this embodiment of the present disclosure, if the hotspot information of the network hotspot does not include the DNS parameter, the first electronic device may generate the target policy route, so that a policy route dedicated to transmitting data of the second electronic device is added to the network route table of the first electronic device.

For example, before the first electronic device configures the target policy route to transmit the second data in step 203, the data transmission method provided in this embodiment of the present disclosure may further include the following steps:

Step A1: Obtain a network interface parameter of the network hotspot in a case that the first electronic device accesses the network hotspot.

Step A2: The first electronic device generates the target policy route based on the network interface parameter of the network hotspot and the IP address of the second electronic device.

Step A3: If the hotspot information of the network hotspot does not include the DNS parameter, the first electronic device adds the target policy route to the network route table of the first electronic device.

For example, the network route table of the first electronic device includes the data network route.

For example, the network interface parameter of the network hotspot includes a network interface name of the network interface of the network hotspot.

For example, the first electronic device may obtain the IP address of the second electronic device by parsing a DHCP interaction network packet (for example, the first response) fed back through the network hotspot of the second electronic device.

For example, after generating the target policy route, the first electronic device may directly add the target policy route to the network route table of the first electronic device. For example, if the network interface name of the network hotspot is rmnet_data2, and the IP of the second electronic device is 193.168.0.1, an addition command of the policy route is "ip route add table rmnet_data2 193.168.0.1 dev wlan0".

For example, in this embodiment of the present disclosure, if the hotspot information of the network hotspot does not include the DNS parameter, it indicates that the network hotspot does not have the network access capability. In this case, to ensure that the first electronic device can normally access the network, the first electronic device may set a data network device of the first electronic device to a default network.

For example, before the first electronic device configures the data network route to transmit the first data in step 203, the data transmission method provided in this embodiment of the present disclosure may further include the following steps:

Step B1: If the hotspot information of the network hotspot does not include the DNS parameter, the first electronic device sets the data network route as a default network route of the first electronic device.

For example, after setting the data network route as the default network route of the first electronic device, the first electronic device sends a WiFi success broadcast to the network hotspot, or returns a WiFi success state by default at a system interface of the electronic device.

For example, the second electronic device is an automobile data recorder. In a related technology, when determining that a data network needs to be used, the electronic device directly sets the data network as a system default network. In this way, a system of the electronic device sends a WiFi disconnect broadcast, and consequently, an automobile data recorder application in the electronic device performs incorrect determining, thereby disconnecting from the automobile data recorder. In addition, when the automobile data recorder application actively invokes a system interface to obtain a WiFi state, the system returns to a WiFi non-connected state, and consequently, the automobile data recorder application in the electronic device considers that the hotspot connection fails, and therefore normal communication cannot be performed with the automobile data recorder. Therefore, in this embodiment of the present disclosure, after setting the data network route as the default network route of the first electronic device, the first electronic device matches a network interface and a broadcast, that is, sends a WiFi success broadcast, or returns a WiFi success state by default at the system interface of the electronic device.

Further, for example, in this embodiment of the present disclosure, the first electronic device may reduce a network score to set the data network device of the first electronic device as the default network.

For example, the foregoing step B1 may include the following step B11 and step B12:

Step B11: If the hotspot information of the network hotspot does not include the DNS parameter, the first electronic device adjusts a network score of the network hotspot.

The adjusted network score of the network hotspot is less than a network score of the data network of the first electronic device.

Step B12: When the network score of the network hotspot is less than the network score of the data network of the first electronic device, the first electronic device sets the data network route as a default network route of the first electronic device.

For example, a network scoring mechanism of an Android system is used as an example. The first electronic device may reduce a network score of a WiFi network of the second electronic device, that is, lower than that of a current data network, to ensure that a system default network keeps as the data network and is not switched. In this way, the system and the application can continuously normally access the network without being interrupted by WiFi.

For example, when the first electronic device accesses the network hotspot of the second electronic device, the first electronic device compares the data network of the first electronic device with the network hotspot of the second electronic device. Further, after comparison, the first electronic device accesses the network hotspot of the second electronic device only when a network score of the network hotspot is greater than a network score of the data network of the first electronic device. In other words, to switch the network currently accessed by the first electronic device to the data network of the first electronic device, a network score of the currently accessed network needs to be reduced until the network score is less than the network score of the data network of the first electronic device.

Figure 3:
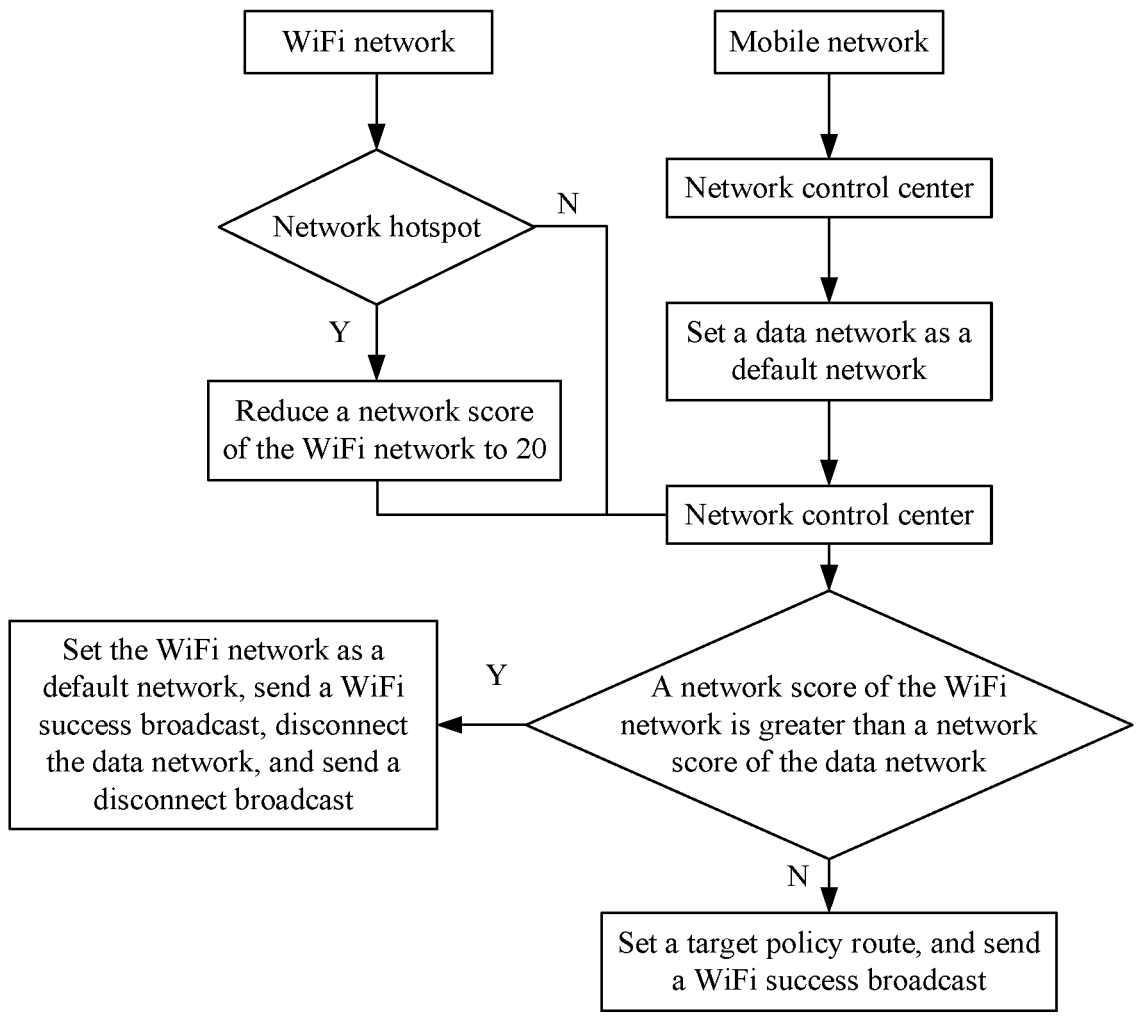
FIG. 3 is a second schematic flowchart of a data transmission method according to an embodiment of the present disclosure.

For example, as shown in FIG. 3, a system of the electronic device is the Android system. In a native mechanism of Android, a basic network score of a WiFi network is 60 points, and a basic network score of a data network is 50 points.

(1) When the first electronic device determines that a WiFi hotspot of the second electronic device that is currently connected to the first electronic device does not have a network access capability, the first electronic device may subtract 40 points from a basic network score of a WiFi network of the WiFi hotspot, so that the basic network score is less than 50 points of the data network. In this way, when a network control center of the first electronic device compares the two networks, because the network score 20 of the WiFi network is less than the network score 50 of the data network, the first electronic device does not switch a default network to the WiFi network, and still keeps the data network as the current default network.

(2) When the first electronic device determines that a WiFi hotspot of the second electronic device that is currently connected to the first electronic device has a network access capability, the first electronic device does not perform any subtraction processing, that is, keeps 60 points of the WiFi network, so that the score is greater than 50 points of the data network. In this way, when the network control center of the first electronic device compares the two networks, because the network score 60 of the WiFi network is greater than the network score 50 of the data network, the first electronic device sets the WiFi network to a system default network, disconnects from the data network, and sends a network disconnect broadcast. In this way, data transmission between the first electronic device and the second electronic device is not affected.

It should be noted that, in this embodiment of the present disclosure, the message display method shown in the accompanying drawings of the foregoing methods is described by using one accompanying drawing of the embodiments of the present disclosure as an example. In an implementation, the message display method shown in the accompanying drawings of the foregoing methods may be further implemented with reference to any other accompanying drawings that may be combined as shown in the foregoing embodiments, and details are not described herein again.

Figure 4:
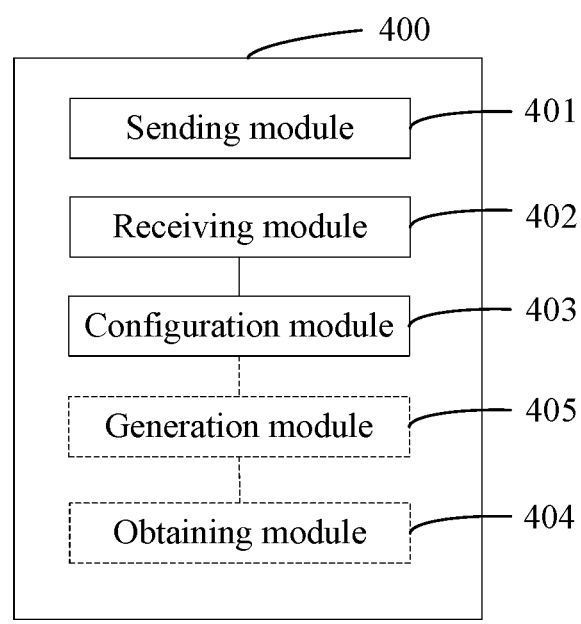
FIG. 4 is a first schematic structural diagram of an electronic device according to an embodiment of the present disclosure.

FIG. 4 is a possible schematic structural diagram of an electronic device according to an embodiment of the present disclosure. The electronic device is a first electronic device. As shown in FIG. 4, a first electronic device 400 includes a sending module 401, a receiving module 402, and a configuration module 403. The sending module 401 is configured to send a first request to a second electronic device in a case that the first electronic device 400 accesses a network hotspot of the second electronic device. The receiving module 402 is configured to receive hotspot information of the network hotspot that is fed back by the second electronic device in response to the first request. The configuration module 403 is configured to: if the hotspot information does not include a DNS parameter of the network hotspot, configure a data network route to transmit first data, and configure a target policy route to transmit second data. The second data is data of the network hotspot, and the first data is data except the second data.

For example, as shown in FIG. 4, the first electronic device 400 further includes an obtaining module 404 and a generation module 405. The obtaining module 404 is configured to obtain a network interface parameter of the network hotspot in a case that the first electronic device 400 accesses the network hotspot. The generation module 405 is configured to generate the target policy route based on the network interface parameter obtained by the obtaining module 404 and an IP address of the first electronic device 400. The configuration module 403 is further configured to add the target policy route to a network route table of the first electronic device 400 if the hotspot information does not include the DNS parameter.

For example, the network route table of the first electronic device 400 includes the data network route.

For example, the configuration module 403 is further configured to: if the hotspot information does not include the DNS parameter, set the data network route to a default network route of the first electronic device 400.

For example, the configuration module 403 is configured to: if the hotspot information does not include the DNS parameter, adjust a network score of the network hotspot, where the adjusted network score of the network hotspot is less than a network score of the data network; and when the network score of the network hotspot is less than the network score of the data network, set the data network route as the default network route of the first electronic device 400.

According to the first electronic device provided in this embodiment of the present disclosure, when the first electronic device accesses the network hotspot of the second electronic device, the first electronic device may send the first request to the second electronic device to request the hotspot information of the network hotspot. When the hotspot information received by the first electronic device does not include the DNS parameter of the network hotspot, it indicates that the network hotspot does not have a function of delivering a DNS; in other words, the network hotspot cannot ensure that an accessed electronic device can perform normal network access. In this case, the first electronic device may configure a data network route to transmit first data, and configure a target policy route to transmit second data, to ensure that the first electronic device performs normal network access, and to further ensure that the first electronic device can maintain data transmission with the second electronic device through the network hotspot.

The first electronic device provided in this embodiment of the present disclosure can implement processes implemented by the first electronic device in the foregoing method embodiments. To avoid repetition, details are not described herein again.

It should be noted that, as shown in FIG. 4, modules necessarily included in the first electronic device 400 are shown in a solid-line frame, such as the sending module 401, and modules that may or may not be included in the first electronic device 400 are shown in a dashed-line frame, such as the obtaining module 404 and the generation module 405.

Figure 5:
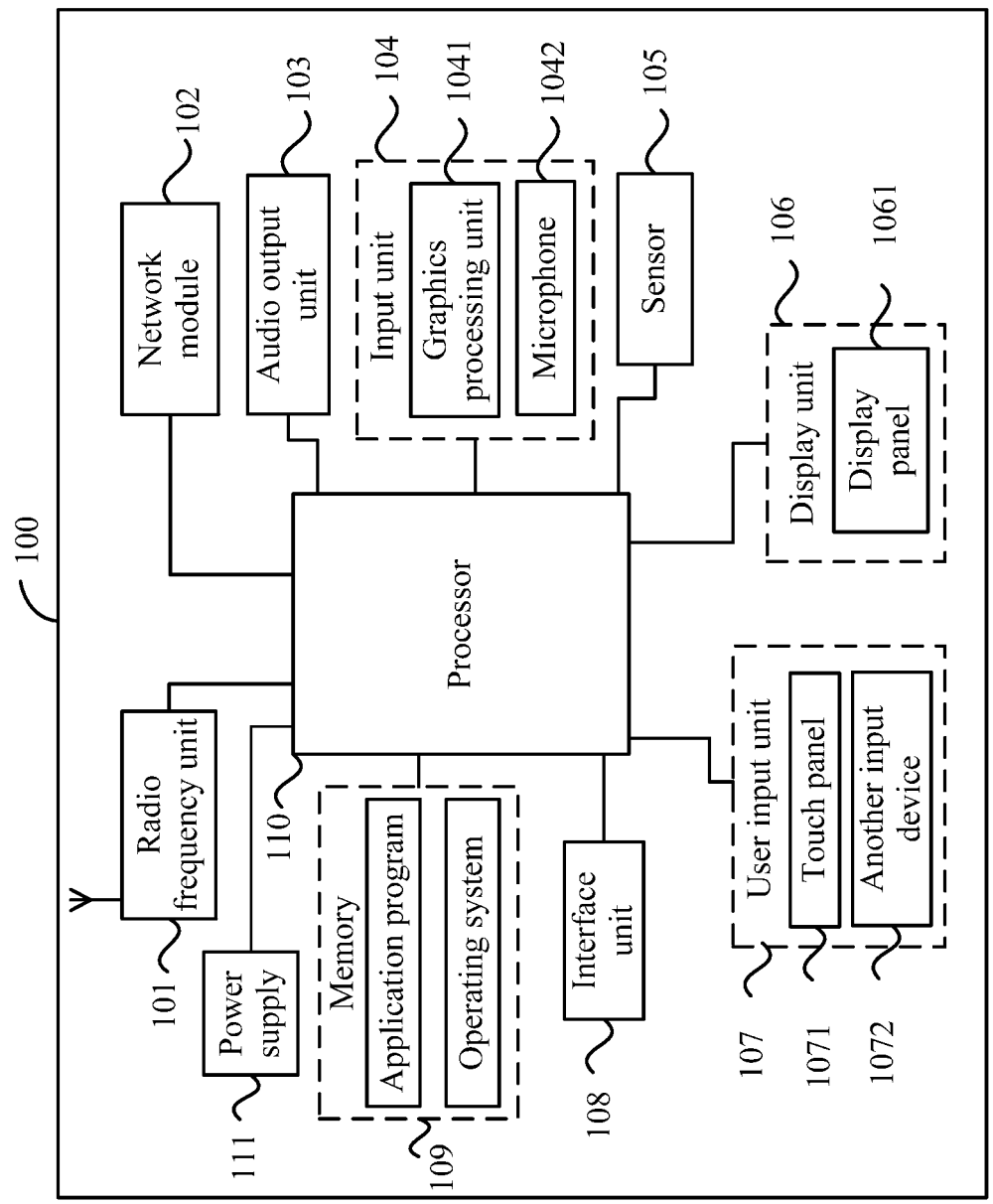
FIG. 5 is a second schematic structural diagram of an electronic device according to an embodiment of the present disclosure.

FIG. 5 is a schematic diagram of a hardware structure of an electronic device for implementing the embodiments of the present disclosure. The electronic device is a first electronic device. the first electronic device 100 includes but is not limited to components such as a radio frequency unit 101, a network module 102, an audio output unit 103, an input unit 104, a sensor 105, a display unit 106, a user input unit 107, an interface unit 108, a memory 109, a processor 110, and a power supply 111. A person skilled in the art may understand that a structure of the electronic device 100 shown in FIG. 5 does not constitute a limitation on the electronic device, and the first electronic device 100 may include more or fewer components than those shown in the figure, or combine some components, or have different component arrangements. In this embodiment of the present disclosure, the first electronic device 100 includes but is not limited to a mobile phone, a tablet computer, a laptop computer, a palmtop computer, an in-vehicle terminal, a wearable device, a pedometer, and the like.

The radio frequency unit 101 is configured to send a first request to a second electronic device in a case that the first electronic device accesses a network hotspot of the second electronic device, where the first request is used to request hotspot information of the network hotspot. The radio frequency unit 101 is further configured to receive hotspot information of the network hotspot that is fed back by the second electronic device in response to the first request. The processor 110 is configured to: if the hotspot information does not include a DNS parameter of the network hotspot, configure a data network route to transmit first data, and configure a target policy route to transmit second data. The second data is data of the network hotspot, and the first data is data except the second data.

According to the first electronic device provided in this embodiment of the present disclosure, when the first electronic device accesses the network hotspot of the second electronic device, the first electronic device may send the first request to the second electronic device to request the hotspot information of the network hotspot. When the hotspot information received by the first electronic device does not include the DNS parameter of the network hotspot, it indicates that the network hotspot does not have a function of delivering a DNS; in other words, the network hotspot cannot ensure that an accessed electronic device can perform normal network access. In this case, the first electronic device may configure a data network route to transmit first data, and configure a target policy route to transmit second data, to ensure that the first electronic device performs normal network access, and to further ensure that the first electronic device can maintain data transmission with the second electronic device through the network hotspot.

It should be understood that, in this embodiment of the present disclosure, the radio frequency unit 101 may be configured to receive and send information or receive and send a signal in a call process. In some embodiments, after downlink data from a base station is received, the processor 110 processes the downlink data. In addition, uplink data is sent to the base station. Generally, the radio frequency unit 101 includes but is not limited to an antenna, at least one amplifier, a transceiver, a coupler, a low noise amplifier, a duplexer, and the like. In addition, the radio frequency unit 101 may further communicate with a network and another device by using a wireless communication system.

The first electronic device 100 provides wireless broadband Internet access for the user by using the network module 102, for example, helping the user send and receive an email, browse a web page, and access streaming media.

The audio output unit 103 may convert audio data received by the radio frequency unit 101 or the network module 102 or stored in the memory 109 into an audio signal and output as sound. In addition, the audio output unit 103 may further provide audio output (for example, call signal receiving sound or message receiving sound) related to a function performed by the first electronic device 100. The audio output unit 103 includes a speaker, a buzzer, a telephone receiver, and the like.

The input unit 104 is configured to receive an audio or video signal. The input unit 104 may include a Graphics Processing Unit (GPU) 1041 and a microphone 1042. The graphics processing unit 1041 processes image data of a static picture or a video obtained by an image capture apparatus (such as a camera) in a video capture mode or an image capture mode. A processed image frame may be displayed on the display unit 106. The image frame processed by the graphics processing unit 1041 may be stored in the memory 109 (or another storage medium) or sent by using the radio frequency unit 101 or the network module 102. The microphone 1042 may receive sound and can process such sound into audio data. The processed audio data may be output by being converted into a format that may be sent to a mobile communications base station by using the radio frequency unit 101 in a telephone call mode.

The first electronic device 100 further includes at least one sensor 105, such as an optical sensor, a motion sensor, and another sensor. In some embodiments, the optical sensor includes an ambient light sensor and a proximity sensor. The ambient light sensor may adjust luminance of a display panel 1061 based on brightness of ambient light, and the proximity sensor may disable the display panel 1061 and/or backlight when the first electronic device 100 approaches an ear. As a type of the motion sensor, an accelerometer sensor may detect the magnitude of an acceleration in each direction (generally three axes), and may detect magnitude and a direction of gravity when being static. The accelerometer sensor may be used for recognizing a gesture of the first electronic device (for example, horizontal and vertical screen switching, a related game, or magnetometer posture calibration), a function related to vibration recognition (for example, a pedometer or a strike), or the like. The sensor 105 may further include a fingerprint sensor, a pressure sensor, an iris sensor, a molecular sensor, a gyroscope, a barometer, a hygrometer, a thermometer, an infrared sensor, and the like. This is not described herein.

The display unit 106 is configured to display information entered by the user or information provided for the user. The display unit 106 may include a display panel 1061, and the display panel 1061 may be configured in a form of a Liquid Crystal Display (LCD), an Organic Light-Emitting Diode (OLED), or the like.

The user input unit 107 may be configured to receive input digit or character information and generate key signal input related to user setting and function control of the first electronic device 100. In some embodiments, the user input unit 107 includes a touch panel 1071 and another input device 1072. The touch panel 1071, also referred to as a touchscreen, may collect a touch operation performed by the user on or near the touch panel 1071 (for example, an operation performed by the user on or near the touch panel 1071 by using any suitable object or accessory such as a finger or a stylus). The touch panel 1071 may include two parts: a touch detection apparatus and a touch controller. The touch detection apparatus detects a touch position of the user, detects a signal brought by the touch operation, and transmits the signal to the touch controller. The touch controller receives touch information from the touch detection apparatus, converts the touch information into contact coordinates, sends the contact coordinates to the processor 110, and can receive and execute a command sent by the processor 110. In addition, the touch panel 1071 may be implemented by using multiple types such as a resistive type, a capacitive type, an infrared ray, and a surface acoustic wave. The user input unit 107 may include another input device 1072 in addition to the touch panel 1071. In some embodiments, the another input device 1,072 may include but is not limited to one or more of a physical keyboard, a function key (such as a volume control key or an on/off key), a trackball, a mouse, a joystick, and the like. Details are not described herein.

Further, the touch panel 1071 may cover the display panel 1061. After detecting the touch operation on or near the touch panel 1071, the touch panel 1061 transmits the touch operation to the processor 110 to determine a type of a touch event, and then the processor 110 provides corresponding visual output on the display panel 1061 based on the type of the touch event. In FIG. 5, the touch panel 1071 and the display panel 1061 are used as two independent components to implement input and output functions of the first electronic device 100. However, in some embodiments, the touch panel 1071 and the display panel 1061 may be integrated to implement the input and output functions of the first electronic device 100. This is not limited herein.

The interface unit 108 is an interface connecting an external apparatus to the first electronic device 100. For example, the external apparatus may include a wired or wireless headset port, an external power supply (or battery charger) port, a wired or wireless data port, a storage card port, a port configured to connect to an apparatus having an identification module, an audio input/output (I/O) port, a video I/O port, a headset port, and the like. The interface unit 108 may be configured to receive input (for example, data information and power) from the external apparatus and transmit the received input to one or more elements in the first electronic device 100, or may be configured to transmit data between the first electronic device 100 and the external apparatus.

The memory 109 may be configured to store a software program and various data. The memory 109 may mainly include a program storage area and a data storage area. The program storage area may store an operating system, an application program required by at least one function (such as a sound play function or an image play function), and the like. The data storage area may store data (such as audio data or an address book) or the like created based on use of the mobile phone. In addition, the memory 109 may include a high-speed random access memory, and may further include a non-volatile memory such as at least one magnetic disk storage component, a flash memory component, or another volatile solid-state storage component.

The processor 110 is a control center of the first electronic device 100, and is connected to all parts of the entire first electronic device 100 by using various interfaces and lines, and performs various functions of the first electronic device 100 and processes data by running or executing the software program and/or the module that are stored in the memory 109 and invoking the data stored in the memory 109, to implement overall monitoring on the first electronic device 100. The processor 110 may include one or more processing units. For example, the processor 110 may be integrated with an application processor and a modem processor. The application processor mainly processes an operating system, a user interface, an application program, and the like, and the modem processor mainly processes wireless communication. It may be understood that the modem processor may also not be integrated into the processor 110.

The first electronic device 100 may further include a power supply 111 (such as a battery) that supplies power to each component. For example, the power supply 111 may be logically connected to the processor 110 by using a power management system, to implement functions such as charging, discharging, and power consumption management by using the power management system.

In addition, the first electronic device 100 includes some function modules not shown, and details are not described herein.

For example, an embodiment of the present disclosure further provides an electronic device, and the electronic device is a first electronic device. The first electronic device includes a processor, a memory, and a computer program that is stored in the memory and may run on the processor 110. When the computer program is executed by the processor, processes of the embodiments of the foregoing data transmission method can be implemented, and a same technical effect can be achieved. To avoid repetition, details are not described herein.

An embodiment of the present disclosure further provides a computer-readable storage medium. A computer program is stored in the computer-readable storage medium. When being executed by a processor, processes of the foregoing data transmission method embodiments can be implemented, and a same technical effect can be achieved. To avoid repetition, details are not described herein. The computer-readable storage medium includes a Read-Only Memory (ROM), a Random Access Memory (RAM), a magnetic disk, an optical disc, or the like.

It should be noted that in this specification, the term "include", "including", or any other variant is intended to cover non-exclusive inclusion, so that a process, method, article, or apparatus that includes a series of elements includes not only those elements but also other elements that are not explicitly listed, or includes elements inherent to such a process, method, article, or apparatus. In the absence of more restrictions, an element defined by the statement "including a . . . " does not exclude another same element in a process, method, article, or apparatus that includes the element.

According to the descriptions of the foregoing implementations, a person skilled in the art may clearly understand that the foregoing method embodiments may be implemented by using software and a required universal hardware platform, or may be implemented by using hardware. However, in many cases, the former is a better implementation. Based on such an understanding, the technical solutions of this application essentially or the part contributing to existing technologies may be implemented in a form of a software product. The computer software product is stored in a storage medium (such as a ROM/RAM, a magnetic disk, or an optical disc) and includes several instructions for instructing a terminal device (which may be a mobile phone, a computer, a server, an air conditioner, or a network device) to perform the methods described in the embodiments of this application.

The embodiments of this application are described with reference to the accompanying drawings. However, this application is not limited to the foregoing implementations. The foregoing implementations are merely examples, but are not limiting. A person of ordinary skill in the art may make many forms without departing from the objective and the scope of the claims of this application, and these forms all fall within the protection scope of this application.

The invention claimed is:

1. A data transmission method, performed by a first electronic device, comprising:
sending a first request to a second electronic device in response to the first electronic device accesses a network hotspot of the second electronic device;

receiving hotspot information of the network hotspot that is fed back by the second electronic device in response to the first request; and when the hotspot information does not comprise a Domain Name Service (DNS) parameter of the network hotspot, configuring a data network route to transmit first data, and configuring a target policy route to transmit second data; wherein the second data is data transmitted between the first electronic device and the network hotspot.

2. The data transmission method according to claim 1, wherein before the configuring a target policy route to transmit second data, the method further comprises:

obtaining a network interface parameter of the network hotspot in response to the first electronic device accesses the network hotspot;

generating the target policy route based on the network interface parameter and an IP address of the second electronic device; and adding the target policy route to a network route table of the first electronic device when the hotspot information does not comprise the DNS parameter.

3. The data transmission method according to claim 1, wherein the network route table of the first electronic device comprises the data network route.

4. The data transmission method according to claim 3, wherein before the configuring a data network route to transmit first data, the method further comprises:

setting the data network route as a default network route of the first electronic device when the hotspot information does not comprise the DNS parameter.

5. The data transmission method according to claim 4, wherein the setting the data network route as a default network route of the first electronic device when the hotspot information does not comprise the DNS parameter comprises:

when the hotspot information does not comprise the DNS parameter, adjusting a network score of the network hotspot, wherein the adjusted network score of the network hotspot is less than a network score of the data network; and when the network score of the network hotspot is less than the network score of the data network, setting the data network route as the default network route of the first electronic device.

6. A first electronic device, comprising: a memory having a computer program; and a processor, wherein the computer program, when executed by the processor, causes the processor to perform operations comprising:

sending a first request to a second electronic device in response to the first electronic device accesses a network hotspot of the second electronic device;

receiving hotspot information of the network hotspot that is fed back by the second electronic device in response to the first request; and when the hotspot information does not comprise a Domain Name Service (DNS) parameter of the network hotspot, configuring a data network route to transmit first data, and configuring a target policy route to transmit second data; wherein the second data is data transmitted between the first electronic device and the network hotspot.

7. The first electronic device according to claim 6, wherein the operations further comprise:

obtaining a network interface parameter of the network hotspot in response to the first electronic device accesses the network hotspot;

generating the target policy route based on the network interface parameter obtained by the obtaining module and an IP address of the second electronic device; and adding the target policy route to a network route table of the first electronic device when the hotspot information does not comprise the DNS parameter.

8. The first electronic device according to claim 6, wherein the network route table of the first electronic device comprises the data network route.

9. The first electronic device according to claim 8, wherein the operations further comprise setting the data network route as a default network route of the first electronic device when the hotspot information does not comprise the DNS parameter.

10. The first electronic device according to claim 9, wherein the operations further comprise:

when the hotspot information does not comprise the DNS parameter, adjusting a network score of the network hotspot, wherein the adjusted network score of the network hotspot is less than a network score of the data network; and when the network score of the network hotspot is less than the network score of the data network, setting the data network route as the default network route of the first electronic device.

11. A non-transitory computer-readable storage medium storing a computer program that, when executed by a processor, causes the processor to perform a data transmission method, the method comprising:

sending a first request to a second electronic device in response to the first electronic device accesses a network hotspot of the second electronic device;

receiving hotspot information of the network hotspot that is fed back by the second electronic device in response to the first request; and when the hotspot information does not comprise a Domain Name Service (DNS) parameter of the network hotspot, configuring a data network route to transmit first data, and configuring a target policy route to transmit second data; wherein the second data is data transmitted between the first electronic device and the network hotspot.

12. The non-transitory computer-readable storage medium according to claim 11, wherein before the configuring a target policy route to transmit second data, the method further comprises:

obtaining a network interface parameter of the network hotspot in response to the first electronic device accesses the network hotspot;

generating the target policy route based on the network interface parameter and an IP address of the second electronic device; and adding the target policy route to a network route table of the first electronic device when the hotspot information does not comprise the DNS parameter.

13. The non-transitory computer-readable storage medium according to claim 11, wherein the network route table of the first electronic device comprises the data network route.

14. The non-transitory computer-readable storage medium according to claim 13, wherein before the configuring a data network route to transmit first data, the method further comprises:

setting the data network route as a default network route of the first electronic device when the hotspot information does not comprise the DNS parameter.

15. The non-transitory computer-readable storage medium according to claim 14, wherein the setting the data network route as a default network route of the first electronic device when the hotspot information does not comprise the DNS parameter comprises:
- when the hotspot information does not comprise the DNS parameter, adjusting a network score of the network hotspot, wherein the adjusted network score of the network hotspot is less than a network score of the data network; and
- when the network score of the network hotspot is less than the network score of the data network, setting the data network route as the default network route of the first electronic device.

\* \* \* \* \*